United States Patent Office 3,111,537
Patented Nov. 19, 1963

3,111,537
TELOMERIC ORGANO-FLUORINE COMPOUNDS
John Reginald Case, Geoffrey Pass, and Hugh Leithead Roberts, all of Northwich, England, assignors to Imperial Chemical Industries Limited, London, England, a corporation of Great Britain
No Drawing. Filed Nov. 6, 1961, Ser. No. 150,190
Claims priority, application Great Britain Nov. 17, 1960
9 Claims. (Cl. 260—456)

This invention relates to novel telomers containing fluorine and to a process for making them, particularly to those in which the repeating part of the telomer molecule is based on hexafluoropropene and the end-groups are derived from classes of compounds conveniently described as fully fluorinated peroxides and hypofluorites.

By fully fluorinated peroxides is understood bispentafluorosulphur peroxide, $SF_5$—O—O—$SF_5$, and organic peroxides having the formula R—O—O—R where R is a fully fluorinated alkyl radical. By hypofluorites is understood the compound pentafluorosulphur hypofluorite, $SF_5$—O—F.

The telomers of the invention are of two closely related types having similar properties. One type contains two oxygen atoms per molecule and is exemplified by the compounds $SF_5$—$O(C_3F_6)_nO$—$SF_5$, and has the general formula R—$O(C_3F_6)_nO$—R in which R represents the pentafluorothio group and fully fluorinated alkyl radicals, whilst the second type contains only one oxygen atom per molecule and is exemplified by the compounds $SF_5$—$O(C_3F_6)_nF$. In both series $n$ is an integer equal to 2 or more; the simple compound in which $n$ is 1 does not appear to be formed in the reaction process.

Thus according to one aspect of our invention we provide a process for making novel telomers of hexafluoropropene comprising reacting hexafluoropropene with a fully fluorinated peroxide as hereinbefore defined.

According to a second aspect of our invention we provide a process for making novel telomers of hexafluoropropene comprising reacting hexafluoropropene with pentafluorosulphur hypofluorite.

Fully fluorinated peroxides, of which bispentafluorosulphur peroxide, $SF_5$—O—O—$SF_5$, and bistrifluoromethyl peroxide, $CF_3$—O—O—$CF_3$, are examples, when reacted with hexafluoropropene yield telomers of the first type having the general formula R—$O(C_3F_6)_nO$—R.

Pentafluorosulphur hypofluoride yields telomers of both types, namely $SF_5$—$O(C_3F_6)_nF$ and $SF_5$—$O(C_3F_6)_nOSF_5$.

The reactions with fully fluorinated peroxides may be carried out at room temperature or moderately elevated temperature and at atmospheric or superatmospheric pressure. A particularly convenient procedure is to heat the reactants for several hours in a sealed vessel to a temperature of between about 100° and 300° C., whereby the reaction takes place under an autogenous pressure of the order of 40 to 80 atmospheres.

The reaction with pentafluorosulphur hypofluorite is more vigorous and is conveniently carried out at room or lower temperatures, for example at from about 20° C. to about —40° C., and in an inert liquid reaction medium for example trichlorofluoromethane.

The most readily formed telomers are those in which $n$ is 2, 3, 4 and 5, and they are formed together with smaller amounts of higher telomers, in which $n$ probably has values up to 10 or 12, in reactions in which the relative proportions of the reactants can differ widely, for example from 5 to 1 molar to 1 to 5 molar. When the proportion of hexafluoropropene to fully fluorinated peroxide becomes as great as 50 to 1 molar more solid compounds are formed, which may be telomers in which $n$ is appreciably greater than 10 or they may be low polymers of hexafluoropropene. For example a reaction mixture containing hexafluoropropene and bistrifluoromethyl peroxide in a molar ratio $C_3F_6$ to $CF_3O_2CF_3$ of about 100 to 1 when heated at 225° C. for several hours yielded products among which was a solid melting at 110° C.

The telomers of the invention are inert to aqueous media, both acidic and alkaline. They are stable in air up to temperatures of at least 250° C. They have good dielectric properties, which they retain to high frequencies, and are useful as dielectric coolants in electronic equipment.

The invention is illustrated by the following examples. In these where superatmospheric pressures were employed the reactions were carried out in a stainless-steel autoclave having a capacity of 250 cc. or in a "Hastelloy C" autoclave ("Hastelloy" is a registered trademark) of 55 cc. capacity, each fitted with a bursting disc operative at 500 atmospheres and having a maximum safe-working pressure of 2500 atmospheres. The autoclave was charged with gaseous reactants by cooling in liquid air and distilling the reactant in from weighed cylinders; liquid reactants were added direct before any cooling. After the reactions were over the autoclave was allowed to reach room temperature and any gas pressure remaining was released through traps cooled in liquid air. The traps were subsequently allowed to warm slowly up to room temperature and their contents combined with those of the autoclave. Gaseous products were examined separately. Columns used for gas-chromatographic analysis were packed with silica supporting a deposit of dinonyl phthalate.

*Example 1*

Bispentafluorosulphur peroxide (25 g.) and hexafluoropropene (60 g.) were heated under autogenous pressure for 15 hours at 150° C. Liquid products amounted to 58 g. and after being washed in dilute caustic soda solution to remove hydrolysable impurities were distilled to yield the following fractions.

(i) 4 g. of $SF_5O(C_3F_6)_2OSF_5$ boiling at 65° C./20 mms. Hg. Analysis gave: C, 12.6; F, 64.2; S 11.6%. $C_6F_{22}O_2S_2$ requires: C, 12.2; F, 71.5; S 10.9%. Density at 25° C. was 2.023; refractive index $n_D^{20}$ was 1.2965.

(ii) 17.6 g. of $SF_5O(C_3F_6)_3OSF_5$ boiling at 70–72°/3 mms. Hg. Analysis gave: C, 15.0; F, 69.6; S, 8.9%. $C_9F_{28}O_2S_2$ requires: C, 14.7; F, 72.2; S, 8.7%. Density at 25° C. was 2.042; refractive index $n_D^{20}$ was 1.3055.

(iii) 14 g. of $SF_5O(C_3F_6)_4OSF_5$ boiling at 90°–94°/3 mms. Hg. Analysis gave: C, 15.8; F, 65.3; S, 7.0%. $C_{12}F_{34}O_2S_2$ requires: C, 16.2; F, 73.0; S, 7.2%. Density at 25° C. was 2.054; refractive index $n_D^{20}$ was 1.3125.

(iv) Ca. 10 g. of higher boiling point liquids.

Gas-chromatographic analysis of each of fractions (i) to (iii) indicated it to contain one major component and traces of the main components of the other fractions. The retention times on the column increased in geometrical progression as commonly found with a series of telomers.

*Example 2*

In an experiment carried out under similar conditions to those described in Example 1 a mixture of 30 g. bispentafluorosulphur peroxide and 15 g. hexafluoropropene gave 10 g. of $SF_5O(C_3H_6)_2OSF_5$ and 6 g. of a mixture of $SF_5O(C_3F_6)_3OSF_5$ and $SF_5O(C_3F_6)_4OSF_5$.

*Example 3*

In a further experiment similar to that in Example 1 a mixture of 20 g. bispentafluorosulphur peroxide and 42 g. hexafluoropropene gave 2 g. of $SF_5O(C_3F_6)_2OSF_5$, 10 g. of $SF_5O(C_3F_6)_3OSF_5$ and 6 g. of $SF_5O(C_3F_6)_4OSF_5$.

Example 4

Bistrifluoromethyl peroxide (85 g.) and hexafluoropropene (150 g.) were heated together at 225° C. for 3 hours under autogenous pressure which reached a maximum of 70 atmospheres and fell to 19 atmospheres by the end of the reaction. The liquid products amounted to 200 g. and on distillation gave the following major fractions.

(i) $CF_3O(C_3F_6)_2OCF_3$, boiling point 100° C./760 mms. Hg; density at 25° C. 1.821. Analysis gave: C, 20.5; F, 73.0%. $C_8F_{18}O_2$ requires: C, 20.4; F, 72.8%.

(ii) $CF_3O(C_3F_6)_3OCF_3$, boiling point 154° C./760 mms. Hg; density at 25° C., 1.903. Analysis gave: C, 21.7; F, 71.1%. $C_{11}F_{24}O_2$ requires: C, 21.3; F, 73.5%.

(iii) $CF_3O(C_3F_6)_4OCF_3$, boiling point 197° C./760 mms. Hg; density at 25° C., 1.990. Analysis gave: C, 22.2; F, 73.7%. $C_{14}F_{30}O_2$ requires: C, 21.8; F, 74.0%.

Example 5

Bistrifluoromethyl peroxide (50 g.) and hexafluoropropene (200 g.) were heated together at 250° C. for 10 hours. Liquid products amounted to 197 g. which the major fractions were the telomers $CF_3O(C_3F_6)_nOCF_3$ in which $n$ is 3, 4 and 5.

Example 6

Pentafluorosulphur hypofluorite (4 g.) and hexafluoropropene (11 g.) and 20 cc. trichlorofluoromethane were reacted in an autoclave at 15°–25° C. for 20 hours. The liquid products after washing with dilute caustic soda solution were distilled and the following fractions obtained.

(i) 18 g. of trichlorofluoromethane.

(ii) 1.5 g. $SF_5O(C_3F_6)_2F$, boiling point 44° C./20 mms. Hg. Analysis gave: C, 15.9; F, 7.46; S, 8.7%. Molecular wt. 442. $SF_{18}OC_6$ requires: C, 15.5; F, 74.0; S, 6.9%. Molecular wt. 462.

(iii) 2.5 g. $SF_5O(C_3F_6)_2OSF_5$, boiling point 65° C./20 mms. Hg.

Example 7

Into a glass tube cooled in liquid air were added pentafluorosulphur hypofluorite (2 g.) and hexafluoropropene (3 g.) and the mixture allowed to warm slowly to room temperature. The reaction mixture was then allowed to reflux with the condenser cooled by a chloroform/carbon tetrachloride/solid carbon dioxide mixture. After the reaction was complete the system was again cooled by liquid air and further hexafluoropropene (6 g.) and pentafluorosulphur hypofluorite (4 g.) added and the mixture refluxed as before. This kind of cycle was repeated until in all 33 g. hexafluoropropene and 24 g. pentafluorosulphur hypofluorite had been added in five stages. Subsequent fractionation gave:

(i) 28 g. $CFCl_3$.

(ii) 7 g. boiling at 44° C./20 mms. Hg of $SF_5O(C_3F_6)_2F$.

(iii) 10 g. boiling at 65° C./20 mms. Hg of $$SF_5O(C_3F_6)_2OSF_5$$

What we claim is:

1. Process for making telomers of hexafluoropropene comprising reacting hexafluoropropene with a fully fluorinated peroxide having the general formula R—O—O—R wherein R is selected from the class consisting of the pentafluorothio group and fully fluorinated methyl radical.

2. Process for making telomers of hexafluoropropene comprising reacting hexafluoropropene with pentafluorosulphur hypofluorite, $SF_5OF$.

3. Process as claimed in claim 1 in which the reactants are heated in a closed vessel at a temperature between 100° C. and 300° C. and the reaction pressure is the autogenous pressure developed by the heating.

4. Process as claimed in claim 1 in which the fully fluorinated peroxide is bispentafluorosulphur peroxide, $SF_5O$—$OSF_5$.

5. Process as claimed in claim 1 in which the fully fluorinated peroxide is bistrifluoromethyl peroxide, $$CF_3O\text{—}OCF_3$$

6. Process as claimed in claim 2 in which the reaction temperature is between about 20° C. and minus 40° C.

7. Telomeric compounds of hexafluoropropene having the general formula $SF_5$—O—$(C_3F_6)_n$—O—$SF_5$ where $n$ is an integer from 2 to 12.

8. Telomeric compounds of hexafluoropropene having the general formula $CF_3$—O—$(C_3F_6)_n$—O—$CF_3$ where $n$ is an integer from 2 to 12.

9. Telomeric compounds of hexafluoropropene having the general formula $SF_5$—O—$(C_3F_6)_nF$ where $n$ is an integer from 2 to 12.

References Cited in the file of this patent

Haupstschein et al.: Jour. Am. Chem. Soc., 80, 851-3 (1958).